United States Patent [19]

Phipps

[11] Patent Number: 5,022,766

[45] Date of Patent: Jun. 11, 1991

[54] TEMPERATURE SENSING DEVICE

[76] Inventor: Jack M. Phipps, 1337 Rutherford Dr., Mesquite, Tex. 75149

[21] Appl. No.: 467,561

[22] Filed: Jan. 19, 1990

[51] Int. Cl.⁵ .................... G01K 1/14; G01K 1/20
[52] U.S. Cl. ...................... 374/209; 236/DIG. 19; 374/158; 374/163
[58] Field of Search .............. 374/208, 185, 158, 209; 236/DIG. 19

[56] References Cited

U.S. PATENT DOCUMENTS

| 3,716,450 | 2/1973 | Lions . | |
| 3,751,305 | 8/1973 | Huebscher . | |
| 3,776,039 | 12/1973 | Bowen | 374/147 |
| 3,845,661 | 11/1974 | Hollweck . | |
| 3,929,018 | 12/1975 | Turner . | |
| 4,318,073 | 3/1982 | Rossler . | |
| 4,575,705 | 3/1986 | Gotcher | 374/208 |
| 4,588,306 | 6/1986 | Burger . | |
| 4,659,236 | 4/1987 | Hobbs | 374/208 |
| 4,729,672 | 3/1988 | Takagi et al. | 374/185 |
| 4,929,093 | 5/1990 | Suzuki et al. | 374/185 |

FOREIGN PATENT DOCUMENTS 0199925 12/1982 Japan ..................... 236/DIG. 19

Primary Examiner—Daniel M. Yasich
Attorney, Agent, or Firm—Shlesinger Arkwright & Garvey

[57] ABSTRACT

A temperature sensing device including a housing for attachment to a wall of a building in an inconspicuous and decoratively functional housing. The housing can come in a variety of shapes and may be designed to complement the interior decor of a room. The housing itself includes a head portion which protects the delicate sensor head from contact with a foreign object which could damage the sensor. Insulation is provided around the sensor cap to prevent the sensor from being influenced by the wall temperature. A seal is provided at the back of the sensor housing to prevent interior wall air from entering the sensor housing and providing a false reading of the ambient room air temperature.

11 Claims, 1 Drawing Sheet

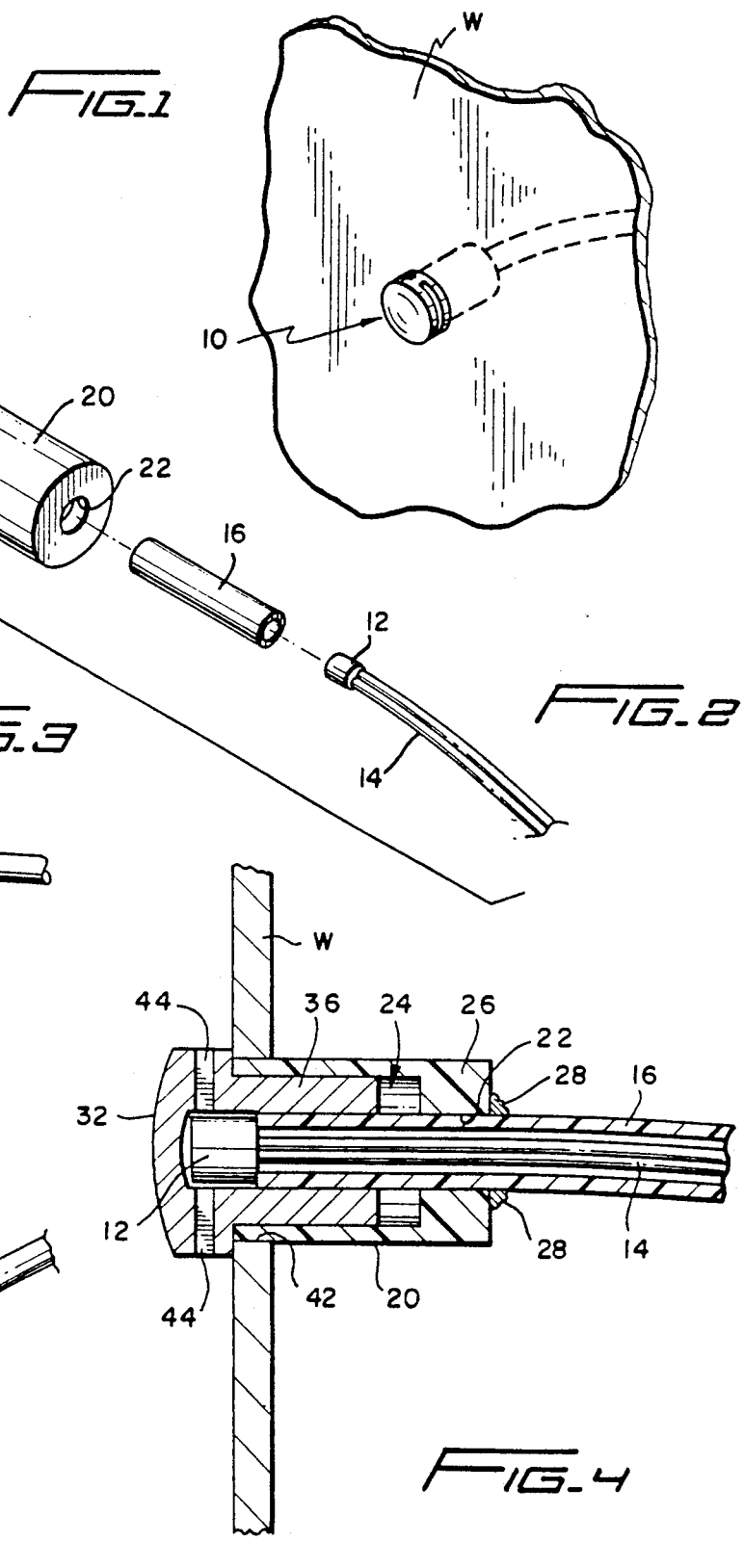

TEMPERATURE SENSING DEVICE

FIELD OF THE INVENTION

This invention relates to a temperature sensor and protective housing for mounting the sensor to a wall in a manner to present an attractive, unobtrusive appearance.

BACKGROUND OF THE INVENTION

Sensors, particularly those used to record and display temperatures in buildings tYpically include a mercury-filled thermometer or may use a metal gage which expands and contracts in response to variations in temperature. The prior art devices, while being functional, are not designed to complement the interior walls of office buildings, particularly those which have marble or wood paneled walls. These prior art thermostats, furthermore, detract from the natural ambiance which the office designer intended to create through the use of specific materials.

In view of the above, it can be seen that there is a need for a device which can provide accurate temperature sensing while being unobtrusive and therebY avoid detracting from the natural appearance of the decor.

OBJECTS AND SUMMARY OF THE INVENTION

The primary object of the disclosed invention is to provide an unobtrusive temperature sensor housing which complements interior wall decor.

Another object of the disclosed invention is to provide housing which is insulated from the wall to give a true reading of ambient air temperature.

Yet another object of present invention is to provide a functional temperature sensor housing which allows ambient air to flow over the sensor enclosed within the housing.

In summary, therefore, this invention is directed to a button sensor housing for a temperature sensor. The housing includes a tube of insulated material surrounding the enclosed sensor and a cap of a shape complementary to wall decor and having air passages therethrough to allow air to pass over the sensor for a true and accurate reading of the ambient air temperature in a room.

These and other objects and advantages of the invention will be readily apparent in view of the following description and drawings of the above identified invention.

BRIEF DESCRIPTION OF TUE DRAWINGS

The above and other objects and advantages and novel features of the present invention will be readily apparent from the following detailed description of the invention illustrated in the accompanying drawing, wherein:

FIG. 1 is a perspective view of the present invention shown mounted on a wall.

FIG. 2 is an exploded view of the button sensor housing, sensor and sensor electrical line comprising the present invention.

FIG. 3 is a side elevational view of the button sensor housing and sensor mounted in a wall.

FIG. 4 is an enlarged cross sectional view of the button sensor housing of FIGS. 1 through 3 mounted in a wall.

FIG. 5 is a perspective view of another embodiment of the button sensor housing, showing spaced passages allowing air to flow across the enclosed sensor.

DETAILED DESCRIPTION OF THE INVENTION

The preferred embodiment of the temperature sensing device 10 is shown in FIGS. 1-4. FIG. 1 shows temperature sensing device 10 mounted in wall W. FIG. 2 is an exploded view of the temperature sensing device 10 having a sensor element 12 and an electrical line 14 leading therefrom to a microprocessor or controller (not shown). One example of this type of sensing element is the PreCon Raw Temperature Sensor which provides precision, remote temperature sensing for building automation systems. The active sensing element is a highly stable, precision thermistor material accurate to within plus or minus 0.38 degrees F. The thermistor material is encapsulated with a low mass, high-conductivity compound, for good heat transfer characteristics. It is enclosed in a rugged, miniature cylinder about 0.17 inches in diameter.

Preferably electrical line 14 is surrounded by tubular shielding material 16 which is formed of a thermal insulating material such as TEFLON.

The sensing device of the present invention further includes a housing 18 having two portions, one of which is an insulating sleeve 20. Preferably, sleeve 20 is formed of similar material to that of tubular shielding material 16, such as TEFLON. While insulating sleeve 20 is by necessity not limited to any particular dimensions due to varying wall thickness, it is preferably of about 0.890 inches in length and its outside diameter is about 0.625 inches.

As shown in FIG. 4, insulating sleeve 20 has an axial bore 22, a portion of which is counterbored to provide a front portion 24 having a bore of increased diameter, being approximately 0.500 inches, and the inside diameter of bore 22 being approximately 0.250 inches. The outside diameter of tubular shielding material 16 is approximately 0.250 inches, which is substantially the same as inside diameter of rear portion 26 so that a tight fit is obtained when sensor element 12 and electrical ine 14 are inserted into insulating sleeve 20. A rear sleeve portion 26 extends between counterbore 24 and one end of sleeve 20, and a sealing compound 28 such as epoxy or silicone is inserted between tubular shielding material 16 and rear portion 26.

The second portion of housing 18 is a cap 30. As shown in FIGS. 2 and 4, cap 30 includes a beveled head or dome 32 joined to a shoulder portion 34 and a depending tubular portion 36. After installation, shoulder 34 bears against wall W and depending portion 36 extends through an opening in wall W, as shown to advantage in FIGS. 3 and 4.

Depending portion 36 is milled to a diameter of about 0.500 inches, corresponding to the inside diameter of front portion 24 of insulating sleeve 20. A bore 38 extends through depending portion 36 from back wall 40 into head 32. Bore 38 is approximately 0.275 inches in diameter and is sized to accommodate sensor element 12.

Insulating sleeve 20 bears against shoulder 34 which has an outside diameter of approximately 0.750 inches. Shoulder 34 extends outwardly beyond the periphery of sleeve 20 to contact wall W and prevents cap 30 from slipping into wall hole 42.

In the preferred form of the invention, saw cuts 44 are made in cap 30 between beveled head 32 and shoulder 34. Saw cuts 44 are cut deep enough to reach bore 38 to allow air to flow from the outside through saw cuts 44 to bore 38 and flow around sensor element 12. Saw cuts 44 form a gap having a width of about 0.062 inches.

Beveled head 32 forms a protective cover over sensor element 12 shielding it from inadvertant contact with objects, and thereby preventing damage to element 12. Shielding material 16, insulating sleeve 20 and sealing compound 28 prevent air behind the wall from contacting sensor element 12 to ensure accurate temperature readings.

FIG. 5 shows another embodiment of the present invention in which portions that are similar to the form of invention illustrated in FIGS. 1 to 4 are identified by like, primed numbers. In this form of the invention, a plurality of radial air passageways 46 extend from the outer periphery of shoulder 34 to the cap bore 38. While FIG. 5 is an example of an alternative embodiment, the invention is not limited to round-headed caps, but a variety of decorative shapes and materials may be used to enhance the room decor.

In order to effect installation of the sensor and housing, a hole 42 is first drilled in the wall, the size of which accommodates insulating sleeve 20, but is smaller than the diameter of shoulder 34. Sensor element 12 and electrical line 14 are fed from their connection to a controller or microprocessor through tubular shielding material 16 and is then fed through insulating sleeve 20 and into bore 38 of cap 30. Front portion 24 of insulating sleeve 20 is next slid over depending portion 36 of cap 30 which has been inserted through hole 42 in wall W. While sensor element 12 is held fully inserted into cap bore 38, sealing compound 28 is applied at rear portion 26 of insulating sleeve 20 to join tubular shielding material 16 to insulating sleeve 20 and thereby prevent air from entering into bore 22 of sleeve 20. After the sealing compound 28 has hardened, sensor element 12 is held in place by the end 48 of tubular shielding material 16 pressing against element 12. Housing 18 is then pressed into the hole 42 until shoulder 34 contacts the wall surface.

While this invention has been described as having preferred embodiments, it is understood that it is capable of further modification, uses and/or adaptations which follow in general the principle of the invention and including such departures from the present disclosure as come within known or customary practice in the art to which the invention pertains, and as may be applied to the central features hereinbefore set forth and fall within the scope of the invention and the limits of the appended claims.

What is claimed is:

1. A temperature sensing device for mounting on a wall, comprising:
   a) an electrically operative temperature sensing element;
   b) housing means surrounding said sensing element;
   c) said housing means including an insulating sleeve surrounding said sensing element;
   d) said housing means further including a protective cap for mounting in the wall and covering the sensing element;
   e) said insulating sleeve is mounted to said cap; and,
   f) said protective cap including a passage therein, whereby ambient air may flow through said passage to said temperature sensing element;
   g) said cap includes a depending portion;
   h) said insulating sleeve has a hollow portion; and,
   i) said depending portion is located inside said hollow portion of said sleeve.

2. The temperature sensing device of claim 1, wherein:
   a) said sleeve includes a bore at one end to allow insertion of said sensing element and passage of an electrical connection device into said hollow portion; and,
   b) sealing means at said one end for preventing ambient air from entering said bore.

3. The temperature sensing device of claim 2, wherein:
   a) said sealing means is formed of silicone.

4. The temperature sensing device of claim 1, wherein:
   a) said passage extends through said cap perpendicularly to said hollow portion.

5. The temperature sensing device of claim 4, wherein:
   a) said depending portion includes a bore therein extending perpendicularly to said passage and being in direct communication with said hollow portion to receive said sensing element.

6. The temperature sensing device of claim 5, further including:
   a) a plurality of said air passages extending radially from said bore.

7. The temperature sensing device of claim 5, wherein:
   a) said cap includes a shoulder portion and a head portion; and,
   b) said shoulder portion abuts the wall when said housing is inserted into the wall.

8. The temperature sensing device of claim 7, wherein:
   a) said shoulder and said head include spaced apart opposed flat surfaces; and,
   b) an air passage is located between said spaced apart opposed flat surfaces for allowing ambient air to flow across said sensor element.

9. A housing for mounting a temperature sensing device to a wall, comprising:
   a) a protective cap having a depending portion;
   b) said depending portion including a hole extending longitudinally therethrough and sized to receive a temperature sensing device;
   c) an insulator connected to said depending portion;
   d) said insulator being cylindrical and further including a longitudinally extending bore therethrough;
   e) said bore being of one diameter at a first end of said insulator for receiving the sensing device and being counterbored to a larger diameter at a second end for slidably receiving said depending portion therein;
   f) sealing means applied to said bore at said first end to prevent ambient air from passing through said bore;
   g) said protective cap includes an air passage therein to permit circulation of the ambient air therethrough;
   h) said air passage extending in a direction generally perpendicularly to said longitudinally extending hole; and,
   i) whereby, when a temperature sensing device is inserted into said housing, the ambient air circulating through said air passage is sensed and sensing of the ambient air at said first end of said insulator is prevented.

10. The housing of claim 9, wherein:
a) said cap includes a plurality of air passages extending radially from said cavity.

11. The housing of claim 9, wherein:
a) said protective cap has a pair of saw cuts forming said air passages.

* * * * *